United States Patent
Pekkucuksen et al.

(10) Patent No.: US 10,817,996 B2
(45) Date of Patent: Oct. 27, 2020

(54) DEVICES FOR AND METHODS OF COMBINING CONTENT FROM MULTIPLE FRAMES

(71) Applicants: Ibrahim E. Pekkucuksen, Plano, TX (US); Hamid Rahim Sheikh, Allen, TX (US); John E. Glotzbach, Allen, TX (US); Ruiwen Zhen, Richardson, TX (US)

(72) Inventors: Ibrahim E. Pekkucuksen, Plano, TX (US); Hamid Rahim Sheikh, Allen, TX (US); John E. Glotzbach, Allen, TX (US); Ruiwen Zhen, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 113 days.

(21) Appl. No.: 16/036,820

(22) Filed: Jul. 16, 2018

(65) Prior Publication Data
US 2020/0020085 A1   Jan. 16, 2020

(51) Int. Cl.
G06T 5/50 (2006.01)
G06K 9/62 (2006.01)
G06T 5/00 (2006.01)

(52) U.S. Cl.
CPC ............. *G06T 5/50* (2013.01); *G06K 9/6202* (2013.01); *G06T 5/002* (2013.01); *G06T 2207/20221* (2013.01)

(58) Field of Classification Search
CPC .......... G06T 5/50; G06T 5/002; G06K 9/6202
USPC ........................................................ 382/191
See application file for complete search history.

(56) References Cited

U.S. PATENT DOCUMENTS

| | | | |
|---|---|---|---|
| 2005/0053291 A1* | 3/2005 | Mishima | H04N 5/145 382/236 |
| 2005/0157792 A1* | 7/2005 | Baba | G06T 3/4007 375/240.16 |
| 2008/0232680 A1 | 9/2008 | Berestov | |
| 2010/0290703 A1 | 11/2010 | Sim | |
| 2011/0074931 A1 | 3/2011 | Bilbrey | |
| 2012/0075489 A1 | 3/2012 | Nishihara | |
| 2014/0118479 A1 | 5/2014 | Rapoport | |
| 2014/0160250 A1 | 6/2014 | Pomerantz | |
| 2014/0178027 A1 | 6/2014 | Lee | |
| 2014/0232907 A1 | 8/2014 | Endo | |

(Continued)

FOREIGN PATENT DOCUMENTS

| | | |
|---|---|---|
| KR | 20110045549 | 5/2011 |
| WO | 2018022197 | 1/2018 |

OTHER PUBLICATIONS

Internaltional Search Report for International Appl. PCT/KR/KR2019/008564 filed on Jul. 11, 2019.

(Continued)

*Primary Examiner* — Michael R Neff
(74) *Attorney, Agent, or Firm* — John J. King

(57) ABSTRACT

A method of combining content from multiple frames with overlapping field of views is described. The method comprises identifying corresponding blocks between a first frame and a second frame of an image; and determining whether to replace at least a portion of the first frame with a corresponding portion of the second frame based on whether there is a match between the first frame and the second frame.

20 Claims, 4 Drawing Sheets

(56) References Cited

U.S. PATENT DOCUMENTS

2014/0240551 A1    8/2014   Kim
2015/0087902 A1    3/2015   Mertz
2016/0028949 A1    1/2016   Lee et al.
2016/0248955 A1    8/2016   Richards
2016/0360103 A1   12/2016   Griffith
2017/0026634 A1    1/2017   Mirlay
2017/0127046 A1    5/2017   Das
2017/0150061 A1    5/2017   Shabtay
2017/0184704 A1    6/2017   Yang
2017/0186163 A1    6/2017   Kim

OTHER PUBLICATIONS

Dual camera smartphones: The history running through to the Galaxy Note 8, Chris Hall, Jun. 23, 2017.
Image Sensor World, Corephotonics and Sunny Ship Millions of Dual Camera Modules to Oppo, Xiaomi and Others, Published Feb. 19, 2018.
EE Times Dual Camera for Image Fusion, published Jun. 6, 2017.
Huawei P20 Pro product brochure, 2018.

* cited by examiner

Transition Pixels 706

US 10,817,996 B2

DEVICES FOR AND METHODS OF COMBINING CONTENT FROM MULTIPLE FRAMES

FIELD OF THE INVENTION

An embodiment of the invention relates generally to devices having multiple cameras, and in particular, to devices for and methods of combining content from multiple frames.

BACKGROUND OF THE INVENTION

Digital cameras are electronic devices that capture an image that is stored in a digital format. Other electronic devices, such as smart phones, tablets or other portable devices, are often equipped with a camera to enable the capture of images. As the demands for improved functionality of cameras or electronic devices having cameras has increased, multiple cameras having different functionality have been implemented in electronic devices. According to some implementations, a dual camera module in an electronic device may contain two different lenses/sensors. For example, a wide angle (wide) lens may be used with a telephoto (tele) lens to approximate the optical zoom effects. The two sensors are operated simultaneously to capture an image of the same scene, respectively referred to as a wide image and a tele image. Because the wide and tele lenses have different focal lengths, each will provide different fields of view (FOV). The wide image reflects a wider FOV, while the tele image has an FOV that may be approximately one half of the wide image for example, although the ratio of the tele image to the wide image could be some other value. While the two images are separately useful, combining portions of the two images together can be difficult.

Therefore, methods of using two images to generate a single image are beneficial.

SUMMARY OF THE INVENTION

A method of combining content from multiple frames with overlapping field of views is described. The method comprises identifying corresponding blocks between a first frame and a second frame of an image; and determining whether to replace at least a portion of the first frame with a corresponding portion of the second frame based on whether there is a match between the first frame and the second frame.

An electronic device is also described. The electronic device comprises at least one camera; and a processor coupled to receive images captured by the at least one camera, wherein the processor identifies corresponding blocks between a first frame and a second frame of an image; and determines whether to replace at least a portion of the first frame with a corresponding portion of the second frame based on whether there is a match between the first frame and the second frame.

A non-transitory computer-readable storage medium having data stored therein representing instructions executable by a processor is described to perform a method comprising identify corresponding blocks between a first frame and a second frame of the image; and determining whether to replace at least a portion of the first frame with a corresponding portion of the second frame based on whether there is a match between the first frame and the second frame.

DETAILED DESCRIPTION OF THE DRAWINGS

Figure 1:
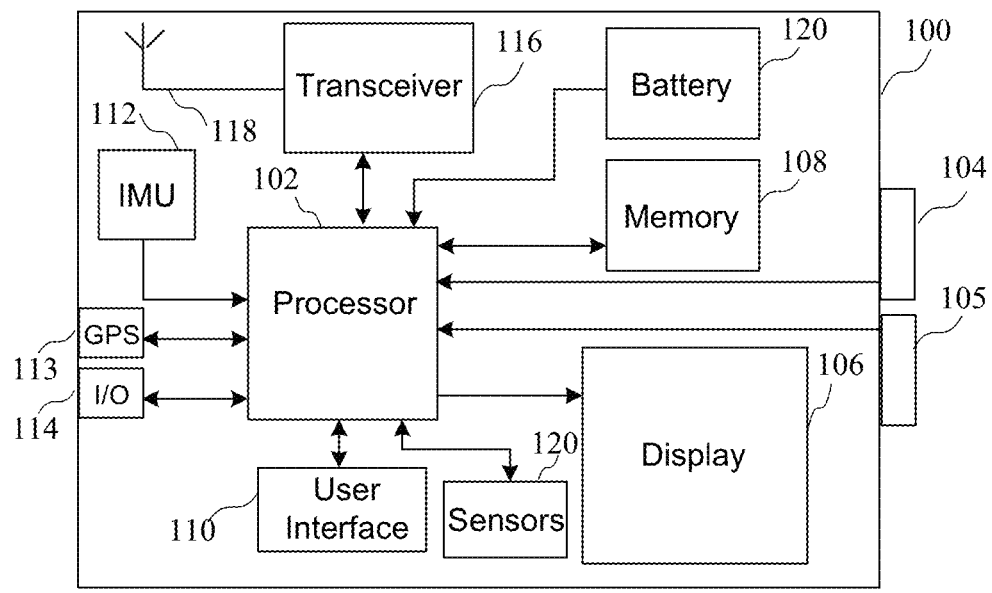
FIG. 1 is a block diagram of an exemplary electronic device having a plurality of cameras.

The circuits and methods set forth below describe the transfer of content from at least one frame to another to improve the image quality of the other frame. The content may comprise image detail which may be pixel data. For the case of two frames, they could be obtained from the same camera module captured in succession with the same settings or different settings. For the case of frames captured by the same camera, there will be a time difference between the frames which will introduce object motion to the scene.

Alternatively, the multiple images could be obtained from two different camera modules on the same device capturing the scene simultaneously. The cameras could be identical or they could be configured with different optical elements to enable optical zooming for the system. For the case of frames captured by different cameras, time differences between frames can be minimized with synchronization. However, the image properties will be different which will make finding correspondence between the frames more difficult. Furthermore, the baseline (i.e. separation) between the cameras will cause disparity issues that will increase as the objects in the scene get closer to the device.

In a configuration having both a wide-angle camera and a tele camera for example, a wide frame will have a larger field of view than the tele frame, but texture detail and edge clarity will be less than that of the tele frame. The tele frame, on the other hand, will have a smaller field of view. Therefore, depending on the desired zoom level, there will be areas of wide frame that are not available in tele frame. To improve image quality, it is possible replace a portion of the wide frame with the tele frame for the region where tele frame is. However, the transition from the tele frame to wide only areas presents a challenge because of both baseline differences and color tone and exposure differences between the two cameras.

According to some aspects of the invention, instead of bringing the entirety of tele frame to the wide frame, the circuits and methods set forth below replace portions of the wide image with image data from the tele image. Further, only the luminance data of the pixel data associated with pixels of the tele image are used to replace luminance data for some pixels of the wide image. For example, wide high frequency luminance content may be replaced with that of tele high frequency luminance content where the replacement will lead to improved image quality. By replacing only the luminance content, it is not necessary to correct for disparity or color changes along the camera transition regions. If an image is captured with an RGB camera, the image can be transferred to format having luminance, such as YUV, where Y represents the luminance portion and UV represents the color portion in the pixels of the image. According to other implementations, color content associated with an image could also be replaced.

While specific examples set forth below may relate to a wide/tele dual camera arrangement, it should be understood that the circuits and methods for combining information from different images could relate to any arrangement of camera elements that captures two frames, where portions of the two frames may be combined to create a frame having am improved image.

Further, while the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a block diagram of an electronic device having a plurality of cameras is shown. The exemplary electronic device 100 that may be any type of device having one or more cameras. The mobile device 100 may comprise a processor 102 coupled to a plurality of cameras 104 and 105. The mobile device 100 could be any type of device adapted to transmit and receive information, such as a smart phone, tablet or other electronic device receiving or providing information, such as a wearable device. The processor 102 could be an ARM processor, an X86 processor, a MIPS processor, a graphics processing unit (GPU), a general purpose GPU, or any other processor configured to execute instructions stored in a memory. The processor 102 could be implemented in one or more processing devices, where the processors may be different. For example, the electronic device could include a central processing unit (CPU) as well as a GPU for example. The operation of the processing circuit may rely upon both software and hardware to implement various features of the circuits and methods set forth below.

The processor 102 may be coupled to a display 106 for displaying information to a user. The processor 102 may also be coupled to a memory 108 that enables storing information related to data or information associated with image data. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic drive or external memory accessible by the electronic device.

A user interface 110 is also provided to enable a user to both input data and receive data. Some aspects of recording images may require user's manual input. The user interface 110 could include a touch screen user interface commonly used on a portable communication device, such as a smart phone, smart watch or tablet computer, and other input/output (I/O) elements, such as a speaker and a microphone. The user interface 110 could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 120, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor 102 may receive input data by way of an input/output (I/O) port 114 or a transceiver 116 coupled to an antenna 118. While the elements of the electronic device are shown by way of example, it should be understood that other elements could be implemented in the electronic device of FIG. 1, or electronic devices that are arranged differently to implement the methods set forth below.

Figure 2:
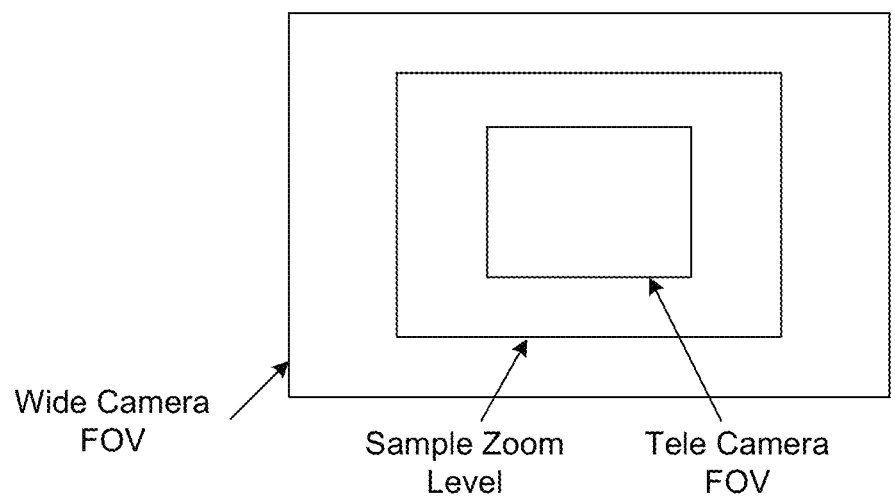
FIG. 2 is a diagram showing an example of a combination of wide and tele images.

Turning now to FIG. 2, a block diagram shows an example of a combination of wide and tele images. As shown in FIG. 2, an example of a sampled zoom level in relation to a wide camera FOV and a tele camera FOV. For a wide/tele dual camera pair, image quality can be improved by selectively combining frames, where a decision may be made based upon a comparison of portions of the wide image and the tele image to transfer all or parts of the tele image. The wide camera has a wider field of view, so it is a natural choice to be the reference frame at certain zoom ratios. The frames will have perspective mismatch because of the baseline between cameras and photometric mismatch because of Image Signal Processor (ISP) module differences.

While an example of combining images shown by way of example in FIG. 2 relates to wide and tele images, it should be understood that the circuits and methods may be used for combining any images associated with a scene that have different properties. While images generated by a wide-angle camera and a tele camera would have different properties based upon the focal lengths of the lenses of the camera, different images from different cameras could also have different properties based upon the types of sensors for detecting light that are implemented in the cameras. For example, a first image could be generated by an RGB (red-green-blue) camera and a second image can be generated by a monochrome (mono) camera. The two images can be generated by two cameras having the same camera properties (e.g. both wide-angle or tele cameras, or both RGB cameras), but where the resulting image may be different, due for example to different timing of capturing the images between the two cameras, to a different location of the camera on the device, or to different ISP processing for the two cameras. That is, although the two cameras may have the same image sensors and optical components, the resulting images may be different, and a portion of one image can be combined with the other to generate an improved image. It should also be noted that a single camera could be used, where two or more images of the single camera can be used to generate a combined image, where the different images would be taken at different times.

Figure 3:
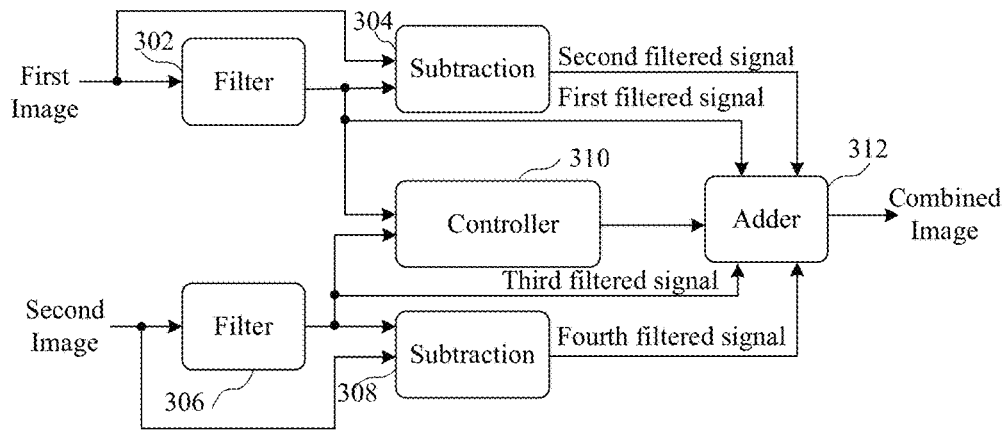
FIG. 3 is a block diagram showing an example of a circuit for combining portions of two images.

Turning now to FIG. 3, a block diagram shows an example of a circuit for combining portions of two images. The circuit of FIG. 3 comprises first and second paths adapted to receive and process first and second images to generate a combined image, where the combined image has improved image quality compared to the first and second images separately. More particularly, a first filter 302, which may be a low pass filter for example, is coupled to receive the first images, and generate a first filtered signal. Depending upon the filter used, the first filtered signal could represent a certain frequency component of the image. For example, if a low pass filter is used, the first filtered signal represents a low pass signal associated with the first image. A subtraction circuit 304 is coupled to receive the first image and the first filtered signal, where the subtraction circuit 304 generates a second filtered signal that represents the first filtered signal subtracted from the first image. A second filter 306, which also may be a low pass filter for example, is coupled to receive the second image, and generate a third filtered signal. The second image and the third filtered signal is coupled to a subtraction circuit 308 to generate a fourth filtered signal.

A controller 310 is coupled to receive the outputs of the first filter 302 and the second filter 306 and generate control signals that are coupled to an adder 312. According to another implementation, the first and second images, rather than the filtered images may be provided to the controller. The control signals enable the adder 312 to combine selected portions of the first image and the second image to generate a combined image that has improved image quality compared to the first and second images alone, as will be described in more detail below. That is, rather than combining an entire image into another image (i.e. a base image), such as combining a tele image into a corresponding part of a wide image, the control signals can enable the transfer of no portions of an image, certain portions of an image, or an entire image into the base image, as will be described in more detail below. By selectively using portions of an image in corresponding portions of a base image, it is possible to avoid the introduction of aberrations that may degrade the quality of the resulting image.

Figure 4:
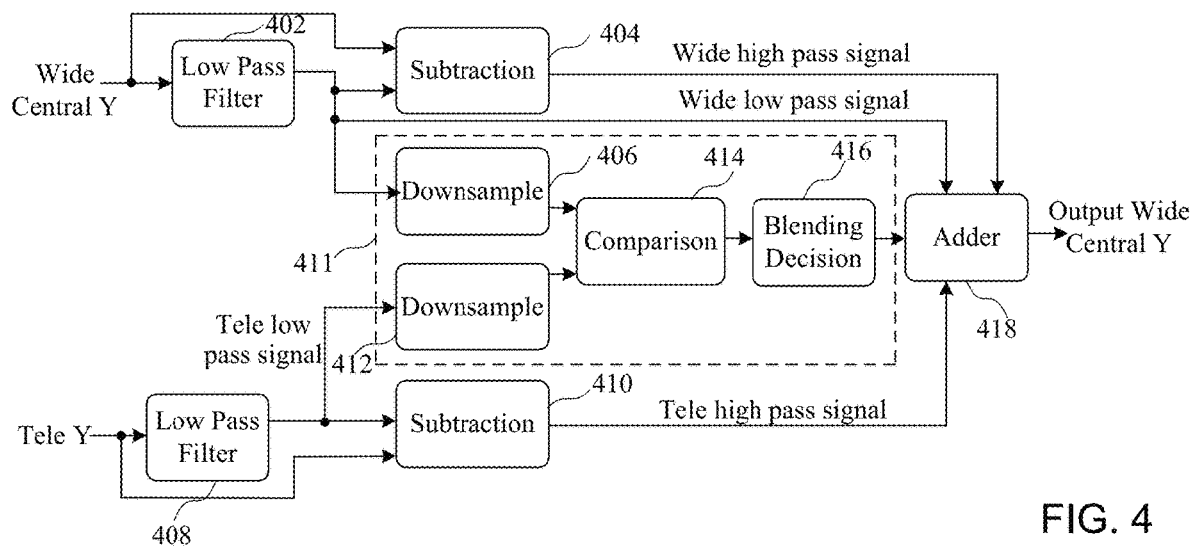
FIG. 4 is another block diagram showing an example of a circuit for combining portions of two images.

Turning now to FIG. 4, another block diagram shows an example of a circuit for combining portions of a wide image and a tele image. More particularly, the circuit of FIG. 4 comprises a first path for receiving a wide-angle image, where a central portion of the wide-angle image (Wide Central) is coupled a low pass filter 402 and a subtraction circuit 404, where an output of the low pass filter 402 is coupled to a downsample circuit 406. An output of the low pass filter 402 comprises a low pass signal for the wide-angle image (Wide low pass signal). The subtraction circuit 404 is coupled to receive the Wide image and the output of the low pass filter 402 to generate a high pass signal associated with the wide image (Wide high pass signal).

The circuit of FIG. 4 also comprises a second path for receiving a tele image that is coupled a low pass filter 408 and a subtraction circuit 410, where an output of the low pass filter is coupled to a downsample circuit 412. An output of the low pass filter 408 comprises a low pass signal for the tele image (Tele low pass signal). According to one implementation, the low pass filter replaces each pixel with an average value of local neighboring pixels. This filtering tends to smooth down high frequency content, such as edges and texture in the image. The subtraction circuit is coupled to receive the tele image and the output of the low pass filter 408 to generate a high pass signal associated with the tele image (Tele high pass signal). That is, by taking the difference between original image frames and the filtered versions, high pass signals for both wide and tele images can be obtained.

The downsample circuit 406 and the downsample circuit 412 are a part of a control circuit 413 that determines what portions of one image, such as the tele image to combine with the other image, such as the wide image to generate a combined image having improved image quality. More particularly, a comparison circuit 414, which provides local search and matching operations as will be described in more detail below, is coupled to receive the downsampled outputs of the downsample block 406 and the downsample block 412. The comparison block 414 performs a search of the images to determine if there is a match between portions of a central portion of the wide image and the Tele image for example. Because portions of the wide and tele images are combined, it is necessary to determine whether portions of the images match, which would enable the combination of a portion of one image in the other image.

A blending decision circuit 416 is also used to blend the portion of the image that is used to replace a corresponding portion of the other image to ensure that there are no aberrations in the combined image. For example, when using the wide image as the base image, and replacing portions of the wide image with corresponding portions of the tele image, the resulting combined image will have a better appearance if portions of the combined image are processed to provide blending between the edge of the portion of the tele image that is added to the wide image, as will be described in more detail in reference to FIG. 7. Therefore, the comparison circuit 414 determines which portions of the images to combine, while blending decision circuit 416 improves the quality of the generated image by avoiding abnormalities or aberrations when combining the image. Control signal generated by the blending decision block 416 are coupled to an adder 418 to control what portions of the Wide low pass signal, the Wide high pass signal, and the tele high pass signal are used to generate the output signal Output Wide Central Y, which may be for example a portion of the wide image modified with portions of the tele image.

The level of downsampling by the downsampling circuits 406 and 412 can be selected to reduce the amount of processing required, while still being able to compare portions of the tele image with the wide image. According to one implementation, 4× downsampling can be performed, where for example only every fourth pixel is used for purposes of comparing the tele image with a portion of a wide image. While the downsampled signals are used to reduce the amount of processing as will be described in more detail below, it should be understood that the output of the low pass filters 402 and 408 could be coupled the comparison block 414. Further, while only the luminance portions of the wide and tele images are provided to the low pass filters 402 and 408 according to one implementation as shown in FIG. 4 to reduce processing requirements of the images, it should be understood that the entire wide and tele images could be provided to the low pass filters 402 and 408.

The circuit of FIG. 4 enables a soft decision related to the combination of a tele image with a wide image or a portion of the wide image in the spatial domain. The circuit of FIG. 4 generally extracts low and high frequency signals from both the tele and wide frames, finds local correspondences between blocks of the frames, evaluate the error between the corresponding blocks, and determines whether to replace a portion of the wide image with the entire tele image, partially replace a portion of the wide image with the entire tele image, or keep the wide detail signal, depending on the error between the corresponding blocks. The circuit of FIG. 4 provides a low complexity, image detail transfer for each block of a frame in a single step without any dependency on the rest of the frame. By determining whether to transfer detail for each block rather than transferring the entire tele image into a portion of the wide image, an improved output image can be generated with reduced or no bending of straight lines, reduced or no color transition artifacts, and reduced or no suppression of dynamic range.

As will also be described in more detail below, the circuit of FIG. 4 provides a simple way to regularize motion vectors between wide and tele blocks. A preprocessing error signal can be generated to make the circuit resilient to exposure differences and to differentiate between actual mismatch caused by occlusion, inaccurate motion estimation etc. versus texture difference between wide and tele blocks. Further, local edge strength can be used to normalize the error calculation which helps to eliminate ghosting artifacts.

The circuits and methods also enable modulating a transfer level of pixels or a group of pixels to avoid creating artifacts. The transfer level, which could be considered to be a weighting between the wide image and the tele image for high frequency components of the image for example, could be controlled for example by the following equation, where $$\text{OutHighFreq} = \text{TeleHighFreq} * \alpha + \text{WideHighFreq} * (1 - \alpha),\quad \text{EQ 1.}$$

As an error level as determined by the comparison circuit 416 increases, the weighting value a decreases. When a is zero, the wide image is used as a default. Further, the implementation of block based processing provides smooth transitions. That is, to smooth the transition from one block to the next, overlapping blocks can be used, where the contribution from the neighboring blocks ramps down smoothly over a number of pixels, as will be described in more detail in reference to FIG. 7.

Additional details related to the comparison block 414 are now provided. The downsampled frames based upon the outputs of the filters 402 and 408 are divide into blocks and, for each block of the wide image, the tele frame is searched for a corresponding block. For example, a current wide block could be fixed, and a search would be performed for its match in the tele image in a small area around the block. An error calculation is performed to determine whether there is a match between the wide block and the tele block. To make the error calculation robust to exposure differences, the blocks may be normalized by taking out their mean. The difference is then passed through a minimum filter, such as a 2D minimum filter, and normalized using a local edge metric. This normalizing operation is performed to improve blending around edges and texture if the difference signal dies down quickly along one direction. For example, if a difference signal does not die down quickly, then the block may contain a partial mismatch, which may need to be considered when blending. For example, blending may need to be turned off to avoid ghosting artifacts when combining the portions of the images.

According to one implementation, normalized cross correlation provides a correlation measure for each motion vector. The motion vector with the highest correlation may be considered to be the correct motion vector. However, the correlation values may be very close to one another. In such cases, it may be beneficial to select a motion vector that is close to zero, which would generally correspond to the no motion case if the frames are correctly registered. Motion vectors close to zero are given an advantage by multiplying the correlation map with a Gaussian curve centered at (0,0).

The maximum score would be selected, where the offset of its location would provide the chosen motion vector. Regularizing motion vectors in an efficient way to minimize discontinuity, where an observation about zero motion vector as being more likely than other motion vectors is made. Since the error metric is a correlation, higher score corresponds to less error, and multiplying motion vector scores with such a curve provides motion vector regularization towards zero motion vector.

The motion vectors may be estimated in a single step at a downsampled resolution, but pixel level accuracy may be maintained using curve fitting on the error signal. It should be noted that downsampling of each frame by 4× reduces motion vector search calculation by approximately 16×. Curve fitting may be performed separately for each of the horizontal and vertical directions, or can be done simultaneously on the 2D error map.

The tele block with maximum correlation may then be selected as the match, and its relative position to the wide block becomes the estimated motion vector. However, the resolution of the motion vector estimate may be for multiple pixels because of the downsampling. That is, because of the 4× downsampling of the input images, the motion vector only has 4-pixel resolution, where the circuit may increment 4 pixels at a time at the original resolution. To estimate single pixel level motion vectors, second order polynomials can be fit to the correlation scores around the maxima in both directions, where the nearest pixel location to the highest value of these polynomials is taken as an improved estimate.

In order to achieve single pixel accuracy, the score for the selected motion vector, and scores of its neighbors on each side (which will be less than the center score) are generated. A second order polynomial is then fit to these three points. The parameters of this polynomial indicate where the actual maximum value is, which may be a non-integer number, and the closest integer number to it which will provide an improved motion vector location. This polynomial fitting operation is performed for both vertical and horizontal orientations. According to one implementation, the polynomial can be fit as follows:

$$a*x^2 + b*x + c = 0,\quad \text{EQ 2}$$

then the location that gives us maximum value is: $x = -b/(2*a)$.

After determining that there is a match based upon the calculation of the motion vectors, it is then determined whether there is an adequate match. The wide and tele blocks are normalized by subtracting a block mean value from each pixel, and the block error is then calculated with 3×3 minimum filter and an Edge Strength Filter (ESF) denominator in a preprocessing step. Based on the value of this error, a blending level is determined, and a blending decision is performed by the blending decision block 416.

The preprocessing step to determine whether a match is adequate includes generating a preprocessing error signal to make it resilient to exposure differences and texture misclassification. Before calculating the difference between wide and tele blocks, their mean value is subtracted from each pixel value to prevent the exposure differences from adversely affecting the error calculation. A 3×3 minimum filter is calculated on the error signal, where the minimum value is taken in each 3×3 neighborhood. This 3×3 minimum filtering reduces the error footprint of correctly registered texture regions more than it reduces the error for incorrectly registered regions, and therefore helps retain texture regions to be enhanced with tele image details.

Preprocessing of the error signal may be performed as follows:

$$\text{wide\_block\_mean\_value} = \sum_0^n \frac{\text{pixel\_values\_in\_wide\_block}}{\text{number\_of\_pixels\_in\_wide\_block}}. \quad \text{EQ3}$$

for N blocks, and where

Normalized_wide_block=wide_block−wide_block-_mean_value. EQ4

The calculation is also performed for the matched tele block (returned from motion vector search with a normalized cross correlation metric) where:

$$\text{tele\_block\_mean\_value} = \sum_0^n \frac{\text{pixel\_values\_in\_tele\_block}}{\text{number\_of\_pixels\_in\_tele\_block}}. \quad \text{EQ5}$$

The normalized tele block is then calculated as:

Normalized_tele_block=tele_block−tele_block_mean-_value EQ6

Figure 6:
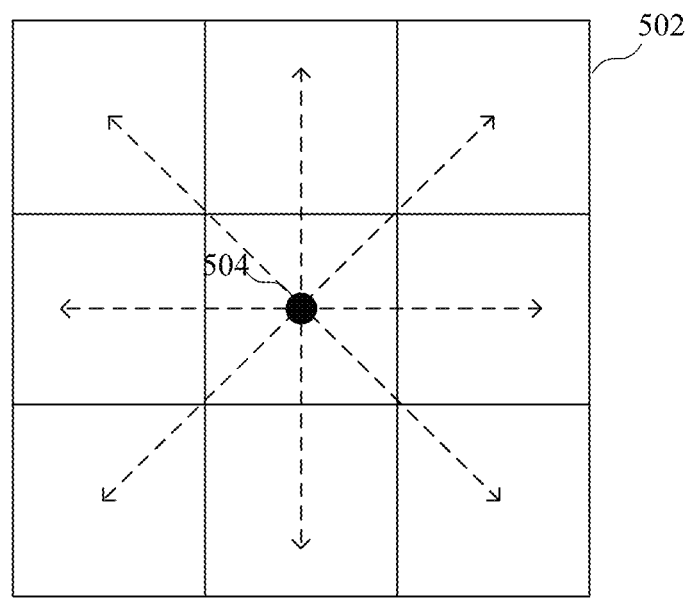
FIG. 6 is a diagram showing the use of local edge strength to normalize error correction.

The block error is then calculated as:

Block_error=$\Sigma_0^n$((min 3×3(abs(NWB−NTB)))$^2$/max (ESF,c), EQ7 where NWB is the Normalized_wide_block, NTB is the Normalized_tele_block, the division symbol/is element-wise division, abs is absolute value, min 3×3 is the 3 by 3 minimum filter, ESF is the edge strength filter as described in reference to FIG. 6, and c is a positive constant number ensuring that the denominator is not zero for any element.

After determining whether the tele block is adequately matched based upon the block error, the final step is to add a combination of the wide and tele high frequency signals to the wide low frequency signal. Depending on the final error score, either tele signal only, wide signal only, or a weighted average of them is used. The transition from one block to the next is smoothed out to avoid sharp changes in detail level, as described in reference to FIG. 7.

Figure 5:
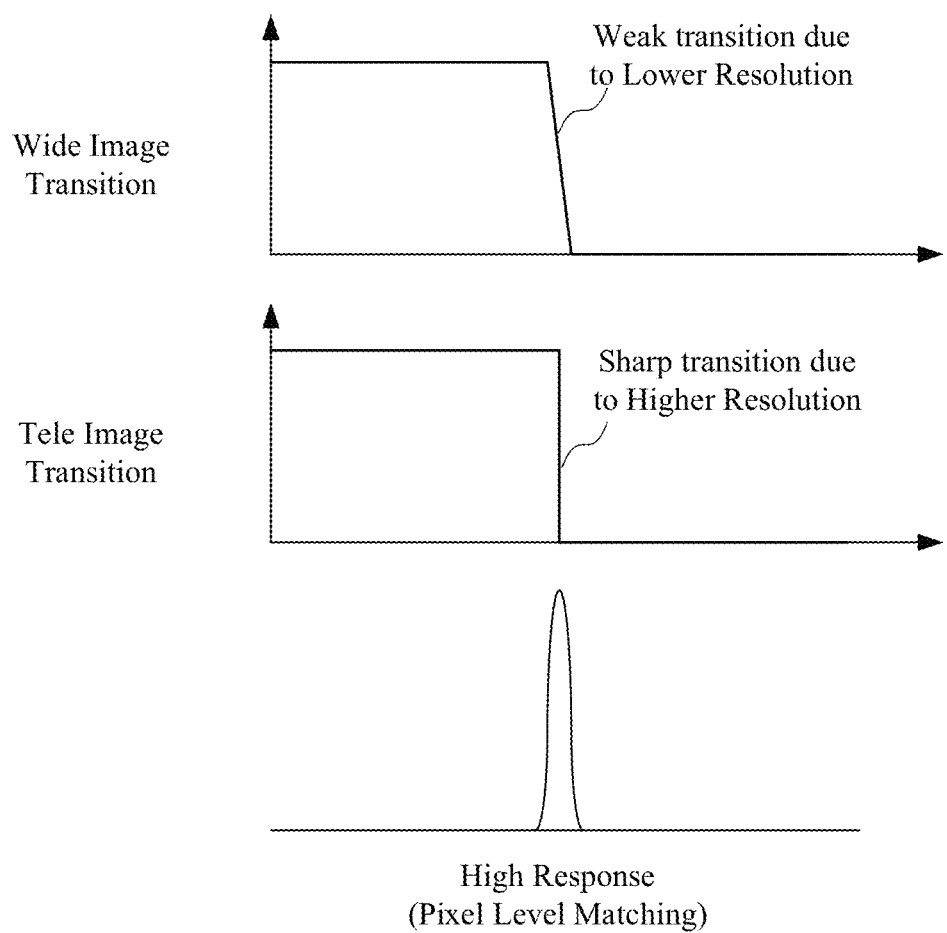
FIG. 5 is a diagram showing variations in transition of an edge in wide image and a tele image.

It should be noted that the circuits of FIGS. 4 and 5 could be implemented in hardware or software, or a combination of hardware and software, such as by using the processor of FIG. 1. While the circuit of FIG. 4 has been described as generating an improved image, the circuit of FIG. 4 could also be used to implement image processing techniques. For example, instead of being applied to entire common field of view between tele and wide cameras, detail transfer can be selectively applied to specific regions based on an estimated depth to help create a bokeh effect, which is an image processing technique where the background of the photo is blurred.

Turning now to FIG. 5, a diagram shows variations in transition of an edge in wide image and a tele image. Local edge strength, as described for example in FIG. 6, may be used to normalize the error calculation and help eliminate ghosting artifacts. Block difference error tends to become high around edges even if they are registered correctly, as shown in FIG. 5. The block difference may be partly because sub-pixel mismatch between the frames is unavoidable. It may be beneficial to normalize for this block difference error using and Edge Strength Filter (ESF) so that blocks with a lot of edge structures are not unnecessarily rejected.

Turning now to FIG. 6, a diagram shows a method of using an Edge Strength Filter for generating a preprocessing error signal. The preprocessing error signal may be calculated by adding absolute gradients in every direction, and which provides a measure of local edge strength. Edge Strength Filter may be applied to the wide image. If tele block is registered correctly, its edges will coincide with wide, and they will get the benefit of the normalization process using the Edge Strength filter. However, if tele image is not registered correctly, their edges will appear elsewhere, and probably end up on a smooth region of wide image, where smooth regions dominate edges in most natural images. Therefore, they will not get a normalization benefit. The normalization of error around correctly registered edges enables more accurate tele frame rejections, which in turn reduces ghosting artifacts.

Figure 7:
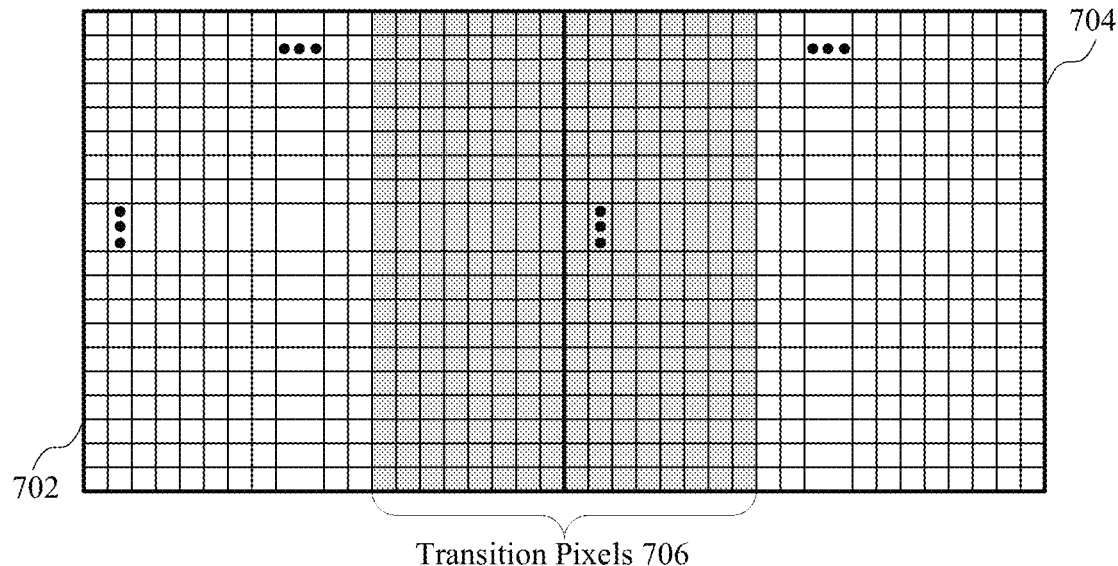
FIG. 7 is a diagram showing a processing of pixel data for two adjacent pixel arrays.

Turning now to FIG. 7, a diagram shows a processing of pixel data for two adjacent pixel arrays. More particularly, pixel array 702 and pixel array 704 comprise 2 adjacent pixel arrays, where transition pixel 706 comprise pixels in adjacent columns of the array. According to the example of FIG. 7, each of the pixel arrays may comprises a 32×32 array, where 8 columns of the array are used for blending. Blending may be gradually performed between the pixel arrays, where for example the pixels of the pixel array 702 (which may comprise pixels of a wide image) may be weighted more toward the wide image pixels and the pixels of the pixel array 704 (which may be a tele image) may be weighted more toward the tele image pixels, and the pixels in the middle of the transition pixels 706 may be more evenly weighted. While the implementation of FIG. 7 shows gradual blending for adjacent sides of two pixel arrays, it should be understood that all of the pixels of a single array, rather than just the transition pixels 706, could be blended.

Figure 8:
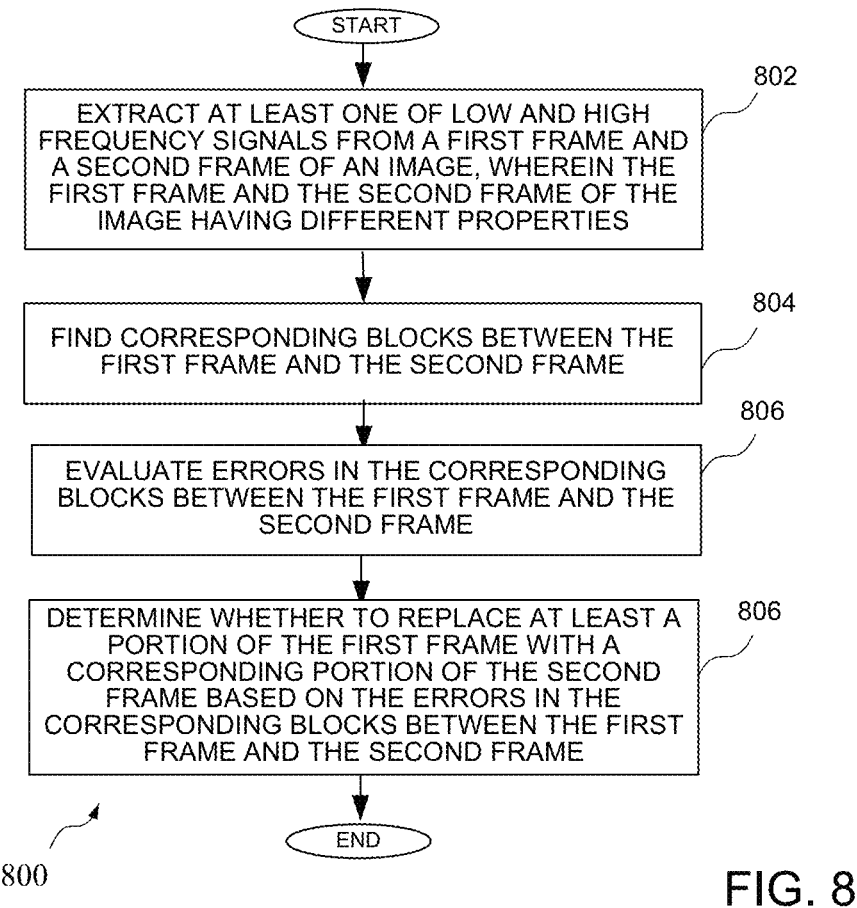
FIG. 8 is a flow diagram showing a method of combining portions of two images.

Turning now to FIG. 8 is a flow diagram shows a method of combining portions of two images. At least one of a low frequency signal and a high frequency signal extracting from a first frame and a second frame of an image at a block 802, wherein the first frame and the second frame of the image having different properties. Corresponding blocks between the first frame and the second frame are identified at a block 804. Errors in the corresponding blocks between the first frame and the second frame are evaluated at a block 806. It is determined whether to replace at least a portion of the first frame with a corresponding portion of the second frame based upon whether there is a match between the frames, which may be based for example on the errors in the corresponding blocks between the first frame and the second frame, at a block 808.

While specific elements of the method are described, it should be understood that additional elements of the method, or additional details related to the elements, could be implemented according to the disclosure of FIGS. 1-7.

It can therefore be appreciated that new circuits for and methods of implementing a device having cameras with focal lengths has been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of combining content from multiple frames with overlapping field of views, the method comprising:

receiving a first frame and a second frame of an image;
extracting a signal comprising a frequency component from the second frame;
identifying corresponding blocks between the first frame and the second frame of the image; and
determining whether to replace at least a portion of the first frame with a corresponding portion of the second frame based on the extracted signal from the second frame and whether there is a match between the first frame and the second frame.

2. The method of claim 1 further comprising extracting at least one of low frequency signals and high frequency signals from the first frame and the second frame of the image, wherein the first frame and the second frame of the image have different properties.

3. The method of claim 2 wherein extracting at least one of low frequency signals and high frequency signals from the first frame and the second frame comprises filtering, for each of the first frame and the second frame, the frame with a low pass filter to generate a filtered version of the frame, and taking the difference between the frame and the filtered version of the frame to generate a high pass signal for the frame.

4. The method of claim 1 wherein identifying corresponding blocks between the first frame and the second frame of the image comprises dividing the first frame and the second frame into blocks, and for each block of the first frame, searching for a corresponding block in the second frame.

5. The method of claim 4 further comprising evaluating errors in the corresponding blocks between the first frame and the second frame.

6. The method of claim 1 further comprising selecting a block of the second frame having a maximum correlation with a block of the first frame, and establishing an estimated motion vector based upon the relative position of the selected block of the second frame to the block of the first frame.

7. The method of claim 6 further comprising generating an error signal associated with the estimated motion vector based upon a mean error value for the block of the first frame and a mean error value for the selected block of the second frame.

8. The method of claim 7 further comprising using a local edge strength to normalize the error signal.

9. The method of claim 6 further comprising generating downsampled image data associated with the first frame and the second frame, wherein establishing an estimated motion vector comprises establishing an estimated motion vector using the downsampled image data.

10. The method of claim 6 further comprising regularizing the estimated motion vector.

11. The method of claim 1 further comprising blending the at least a portion of the first frame that is replaced with a corresponding portion of the second frame.

12. The method of claim 1 wherein the first frame comprises a wide frame and the second frame comprises a tele frame.

13. An electronic device, comprising:
at least one camera; and
a processor coupled to receive images captured by the at least one camera, wherein the processor:
receives a first frame and a second frame of an image;
extracts a signal comprising a frequency component from the second frame;
identifies corresponding blocks between the first frame and the second frame of the image; and
determines whether to replace at least a portion of the first frame with a corresponding portion of the second frame based on the extracted signal from the second frame and whether there is a match between the first frame and the second frame.

14. The electronic device of claim 13 further comprising filtering, for each of the first frame and the second frame, the frame with a low pass filter to generate a filtered version of the frame, and taking the difference between the frame and the filtered version of the frame to generate a high pass signal for the frame.

15. The electronic device of claim 13 wherein identifying corresponding blocks between the first frame and the second frame of the image comprises dividing the first frame and the second frame into blocks, and for each block of the first frame, searching for a corresponding block in the second frame.

16. The electronic device of claim 13 wherein the processor further selects a block of the second frame having a maximum correlation with a block of the first frame, and establishes an estimated motion vector based upon the relative position of the selected block of the second frame to the block of the first frame.

17. A non-transitory computer-readable storage medium having data stored therein representing instructions executable by a processor to perform a method comprising:
receiving a first frame and a second frame of an image;
extracting a signal comprising a frequency component from the second frame;
identifying corresponding blocks between the first frame and the second frame of the image; and
determining whether to replace at least a portion of the first frame with a corresponding portion of the second frame based on the extracted signal from the second frame and whether there is a match between the first frame and the second frame.

18. The non-transitory computer-readable storage medium of claim 17 further comprising filtering, for each of the first frame and the second frame, the frame with a low pass filter to generate a filtered version of the frame, and taking the difference between the frame and the filtered version of the frame to generate a high pass signal for the frame.

19. The non-transitory computer-readable storage medium of claim 17 wherein identifying corresponding blocks between the first frame and the second frame comprises dividing the first frame and the second frame into blocks, and for each block of the first frame, searching for a corresponding block in the second frame.

20. The non-transitory computer-readable storage medium of claim 19 wherein the processor further selects a block of the second frame having a maximum correlation with a block of the first frame, and establishing an estimated motion vector based upon the relative position of the selected block of the second frame to the block of the first frame.

* * * * *